United States Patent [19]

Wissbrun et al.

[11] Patent Number: 5,045,607

[45] Date of Patent: * Sep. 3, 1991

[54] ACETAL POLYMER BLENDS

[75] Inventors: Kurt F. Wissbrun, Short Hills; Hongkyu Kim, Basking Ridge; George L. Collins, Maplewood; Diane Terrone, Toms River, all of N.J.

[73] Assignee: Hoechst Celanese Corp., Somerville, N.J.

[ * ] Notice: The portion of the term of this patent subsequent to Feb. 6, 2007 has been disclaimed.

[21] Appl. No.: 333,511

[22] Filed: Apr. 5, 1989

Related U.S. Application Data

[63] Continuation-in-part of Ser. No. 243,381, Sep. 12, 1988, Pat. No. 4,898,925.

[51] Int. Cl.$^5$ .................... C08L 61/02; C08F 283/06; C08G 65/32
[52] U.S. Cl. .................... 525/398; 525/401; 525/410; 525/412; 525/414
[58] Field of Search ............... 525/398, 401, 410, 412, 525/414

[56] References Cited

U.S. PATENT DOCUMENTS

| | | |
|---|---|---|
| 3,337,507 | 8/1967 | Gutweiler et al. ............... 260/67 |
| 3,519,696 | 7/1970 | Cherdron et al. ............... 525/414 |
| 3,639,192 | 2/1972 | Burg et al. ............... 260/67 |
| 4,070,415 | 1/1978 | Sextro et al. ............... 525/414 |
| 4,758,608 | 7/1988 | Collins et al. ............... 525/410 |
| 4,788,258 | 11/1988 | Collins et al. ............... 525/414 |
| 4,816,107 | 3/1989 | Collins et al. ............... 428/411.1 |
| 4,898,925 | 2/1990 | Collins et al. ............... 525/398 |
| 4,942,208 | 7/1990 | Forschirm et al. ............... 525/414 |

FOREIGN PATENT DOCUMENTS 42-22065 11/1967 Japan .
1223522 2/1971 United Kingdom ............... 525/398

Primary Examiner—John C. Bleutge
Assistant Examiner—W. R. H. Clark
Attorney, Agent, or Firm—Marvin Turken; James L. McGinnis

[57] ABSTRACT

There are provided new moldable blends of a normally crystalline acetal polymer and a normally non-crystalline elastomeric copolymer of about 15 to 45 mol %, preferably about 25 to 35 mol % of trioxane, about 55 to 85 %, preferably about 65 to 75 mol % of 1,3-dioxolane, said mol percents based on the total of trioxane and 1,3-dioxolane, and about 0.005 to 0.15 wt. %, preferably about 0.05 to 0.12 wt. % of 1,4-butanediol diglycidyl ether or butadiene diepoxide as a bifunctional monomer, based on the total weight of copolymer.

11 Claims, No Drawings

ACETAL POLYMER BLENDS

CROSS-REFERENCE TO RELATED APPLICATION

This application is a continuation-in-part of application Ser. No. 07/243,381, filed Sept. 12, 1988 and now U.S. Pat. No. 4,898,925.

BACKGROUND OF THE INVENTION

1. Field of the Invention

Molding compositions comprising acetal polymers having a high degree of crystallinity at room temperature have been in commercial use for many years. They have application in a wide variety of end uses, e.g., automobile applications such as bumper extensions and instrument panels, plumbing supplies such as valves, shower assemblies, flush tank components, faucets and pipe fittings, tool components such as screw driver adaptors, and household and personal products, such as quick boiling electric water kettles.

These crystalline acetal polymers have a highly favorable spectrum of physical properties which are responsible for their wide commercial acceptance. However, for certain applications, an improved capacity of the latter crystalline polymers for being blended into stable homogeneous molding compositions with other components such as certain stabilizers, would be highly desirable. Moreover, for some end uses, e.g., molded parts subjected to recurring mechanical stress, a higher degree of elasticity would be advantageous. Furthermore it may be beneficial when the crystalline acetal polymer is utilized in the fabrication of various articles, e.g., those involving a laminated structure or the use of reinforcing materials in the interior of a molded article, for there to be a greater degree of adhesiveness between the surface of the acetal polymer and another surface, e.g., of metal.

This invention relates to novel improved compositions comprising a moldable acetal polymer which contains a major proportion of oxymethylene units in the polymer chain and a high degree of crystallinity at room temperature. For example, the compositions are capable of forming mixtures with additives such as stabilizers which are fixed to a greater degree than previously. Moreover, the compositions have improved morphology over previously utilized compositions, which makes possible their being fabricated into articles having a higher degree of elasticity and adhesiveness.

2. Description of Related Art

The following prior art references are disclosed in accordance with the terms of 37 CFR 1.56, 1.97 and 1.98.

U.S. Pat. No. 3,639,192, issued Feb. 1, 1972 to Burg et al., discloses for use as adhesives copolymers of formaldehyde or trioxane with 1 to 60% by weight, preferably 1 to 30% by weight, of a cyclic ether, cyclic and/or linear acetal, e.g., 1,3-dioxolane, and/or an alkyl glycidyl formal, polyglycol diglycidyl ether or bis (alkane triol) triformal. Example 5 discloses a terpolymer of 97.95 wt. % of trioxane, 2 wt. % of ethylene oxide, and 0.05 wt. % of 1,4-butanediol diglycidyl ether.

U.S. Pat. No. 3,337,507, issued Aug. 22, 1967 to Gutweiler et al., teaches the formation of high molecular weight copolymers obtained by polymerizing a mixture of trioxane and any of certain polyformals. Example 4 of the patent shows the use of a polyformal which is a clear highly viscous oil at 70° C. obtained by polymerizing a mixture of $\frac{1}{3}$ mole of trioxane and 1 mole of dioxolane in the presence of p-nitrophenyl-diazonium fluoroborate as catalyst.

Japanese Kokai Sho 42-22065 of Yamaguchi et al., published Oct. 30, 1967, discloses copolymers of trioxane and an aperiodic ring compound, e.g., 1,3-dioxolane, prepared in liquid sulfur dioxide, and in Example 1 shows a copolymer of trioxane and 64 mol % of 1,3-dioxolane.

None of the foregoing references teaches any of the specific elastomeric, normally non-crystalline copolymers which are a component of the compositions of this invention, or the blending of any of such elastomeric copolymers with a normally crystalline acetal polymer.

Pending application Ser. No. 243,381, filed Sept. 12, 1988 by Collins et al., discloses and claims the elastomeric copolymers utilized in the compositions of this invention and states that they are useful as blending and adhesive agents for conventional crystalline acetal polymers. The entire disclosure of this application is incorporated by reference.

Pending application Ser. No. 255,569 filed October 11, 1988 by Collins et al., discloses and claims bonded articles, e.g., of conventional crystalline acetal polymers, wherein the bonding agents are the elastomeric, normally non-crystalline copolymers utilized in the compositions of this invention.

SUMMARY OF THE INVENTION

In accordance with this invention, there are provided novel blends of normally crystalline, moldable acetal polymers and elastomeric copolymers of about 15 to 45 mol %, preferably about 25 to 35 mol % of trioxane, about 55 to 85 mol %, preferably about 65 to 75 mol % of 1,3-dioxolane, said mole percents based on the total of trioxane and 1,3-dioxolane, and about 0.005 to 0.15 wt. %, preferably about 0.05 to 0.12 wt. %, of 1,4-butanediol diglycidyl ether or butadiene diepoxide as a bifunctional monomer, based on the total weight of copolymer. In addition to being elastomeric, the latter copolymers are substantially non-crystalline at room temperature (25° C.).

Because the elastomeric copolymers have a strong interaction with normally crystalline acetal polymers widely used in the production of various molded articles, blends of the two polymers have improved morphology and are thus able to form mixtures with any of various other components, e.g., stabilizers, which are fixed to a greater degree than other formulations comprising a normally crystalline acetal polymer. Moreover, because of such strong interaction, the blends of this invention may be fabricated into articles having improved elasticity and adhesiveness.

DESCRIPTION OF PREFERRED EMBODIMENTS

The Elastomeric Copolymer

The monomers used in the preparation of the elastomeric copolymers utilized in the compositions of this invention are preferably fairly dry, i.e., contain no more than about 10 ppm of water. The monomers are dried using techniques well known in the art, e.g., azeotropic distillation with benzene or by distilling the monomer in contact with sodium or potassium metal onto activated molecular sieves and keeping the monomer in contact with circulating nitrogen which itself is dried by contact with $P_2O_5$.

The elastomeric copolymers may be formed by a process of bulk polymerization wherein appropriate amounts of dry 1,3-dioxolane and 1,4-butanediol diglycidyl ether (BDGE) or butadiene diepoxide are added to dry molten trioxane to form a polymerizable mixture which in most cases remains liquid at room temperature. The polymerization reaction is carried out under an inert atmosphere, e.g., one obtained using dry nitrogen, argon, or the like, or a mixture of inert gases, in the presence of a catalytically effective amount of a cationic polymerization catalyst, such as p-nitrobenzenediazonium tetrafluoroborate (PNDB), trifluoromethane sulfonic acid, boron trifluoride, a boron trifluoride etherate such as boron trifluoride dibutyletherate, or the like, e.g., an amount ranging, for example, from about $1 \times 10^{-4}$ M/l to about $5 \times 10^{-3}$ M/l, and preferably from about $1 \times 10^{-3}$ M/l to about $1.5 \times 10^{-3}$ M/l, based on the volume of the reaction medium, i.e., reactants plus any solvents, suspending agents or other additives employed.

If PNDB is used as the catalyst, it is often convenient to add it as a solution, e.g., of about 5 to 10 wt. %, in nitromethane.

The polymerization reaction for the preparation of the elastomeric copolymers is carried out, for example, at a temperature of from about 15° to about 30° C., and preferably at from about 20° to about 25° C., at pressures ranging from about 750 to about 770 psi, for about 15 to about 30 hours, preferably about 20 to about 25 hours.

These polymers can also be prepared under the foregoing conditions by polymerizing the monomers in a solvent, solvent mixture or suspending agent for the monomers, e.g., a halogenated hydrocarbon such as methylene chloride, a hydrocarbon such as hexane, cyclohexane, nonane or dodecane, or the like, or a mixture of two or more of these or other suitable solvents or suspending agents.

In addition to the prescribed monomers, the monomer mixture used to prepare the elastomeric copolymers may contain minor amounts of related monomers, e.g., up to about 5 mol % of other cyclic formals, e.g., ethylene oxide or 1,4-butanediol formal, and up to about 1 wt. % of other bifunctional monomers, e.g., diglycidyl ethers of ethylene glycol and higher alkanediols other than 1,4-butanediol.

The elastomeric copolymers will in most cases have an inherent viscosity of about 0.7 to 2.75, measured at 25° C. in a 0.2 wt. % solution in hexafluoroisopropanol (HFIP). In addition, the elastomeric copolymers are in most cases substantially non-crystalline in the unstretched state at room temperature (25° C.), as indicated by differential scanning calorimetry (DSC) data.

The elastomeric copolymers have enhanced elastomeric properties over a wide temperature range. For example, in most cases they can be formed into a ball that will hold its shape and will not collapse under its own weight after an extended period. Furthermore, the copolymers can usually be stretched in the fashion of a rubber band and substantially recover their previous length when released. When the elastomeric copolymers of the invention are subjected to a standard oscillatory flow test at an elevated temperature, e.g., 190° C., they are shown to largely retain their properties of elasticity and viscosity. Thus, they are particularly suitable for being processed with moldable crystalline acetal polymers at temperatures close to or above the melting points of the latter polymers for the purpose of improving their morphology and/or adhesiveness to other materials.

The Crystalline Acetal Polymers

The moldable, crystalline acetal polymers whose performance is capable of being improved by blending with the contemplated elastomeric copolymers include any oxymethylene polymer having oxymethylene groups which comprise at least about 85 percent of the polymer's recurring units, i.e., homopolymers, copolymers, terpolymers and the like.

Typically, crystalline oxymethylene homopolymers, also called polyformaldehydes or poly(oxymethylenes), are prepared by polymerizing anhydrous formaldehyde or trioxane, a cyclic trimer of formaldehyde. For example, high molecular weight polyoxymethylenes have been prepared by polymerizing trioxane in the presence of certain fluoride catalysts, such as antimony fluoride. Polyoxymethylenes may also be prepared in high yields and at rapid reaction rates by the use of catalysts comprising boron fluoride coordination complexes with organic compounds, as described in U.S. Pat. No. 2,898,506 to Hudgin et al.

Oxymethylene homopolymers are usually stabilized against thermal degradation by end-capping with, for example, ester or ether groups such as those derived from alkanoic anhydrides, e.g., acetic anhydride, or dialkyl ethers, e.g., dimethyl ether, or by incorporating stabilizer compounds into the homopolymer, as described in U.S. Pat. No. 3,133,896 to Dolce et al.

Crystalline oxymethylene copolymers which are especially suitable for utilization with the elastomeric copolymers of this invention will usually possess a relatively high level of polymer crystallinity, i.e., about 60 to 80 percent or higher. These preferred oxymethylene copolymers have repeating units which consist essentially of oxymethylene groups interspersed with oxy(higher)alkylene groups represented by the general formula:

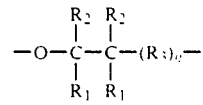

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

Oxymethylene groups generally will constitute from about 85 to about 99.9 percent of the recurring units in such crystalline copolymers. The oxy(higher)alkylene groups incorporated into the copolymer during copolymerization produce the copolymer by the opening of the ring of a cyclic ether or cyclic formal having at least two adjacent carbon atoms, i.e., by the breaking of an oxygen-to-carbon linkage.

Crystalline copolymers of the desired structure may be prepared by polymerizing trioxane together with from about 0.1 to about 15 mol percent of a cyclic ether or cyclic formal having at least two adjacent carbon atoms, preferably in the presence of a catalyst such as a Lewis acid (e.g., $BF_3$, $PF_5$, and the like) or other acids (e.g., $HClO_4$, 1% H , and the like), ion pair catalysts, etc.

In general, the cyclic ethers and cyclic formals employed in making these preferred crystalline oxymethylene copolymers are those represented by the general formula:

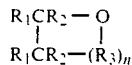

wherein each $R_1$ and $R_2$ is hydrogen or a lower alkyl group, each $R_3$ is a methylene, oxymethylene, lower alkyl-substituted methylene or lower alkyl-substituted oxymethylene group, and n is an integer from zero to three, inclusive. Each lower alkyl group preferably contains one or two carbon atoms.

The cyclic ether and cyclic formal preferred for use in preparing these preferred crystalline oxymethylene copolymers are ethylene oxide and 1,3-dioxolane, respectively. Among the other cyclic ethers and cyclic formals that may be employed are 1,3-dioxane, trimethylene oxide, 1,2-propylene oxide, 1,2-butylene oxide, 1,3-butylene oxide, 1,4-butanediol formal, and the like.

Crystalline oxymethylene copolymers produced from the preferred cyclic ethers have a structure composed substantially of oxymethylene and oxy(lower)alkylene, preferably oxyethylene, groups, and are thermoplastic materials having a melting point of at least 150° C. They normally are millable or processable at temperatures ranging from 180° C. to about 200° C., and have a number average molecular weight of at least 10,000 and an inherent viscosity of at least 1.0 (measured at about 25° C. in a 0.2 wt. % solution in HFIP).

These crystalline oxymethylene copolymers preferably are stabilized to a substantial degree prior to being utilized with the elastomeric copolymers of this invention. This can be accomplished by degradation of unstable molecular ends of the polymer chains to a point where a relatively stable carbon-to-carbon linkage exists at each end of each chain. Such degradation may be effected by hydrolysis, as disclosed, for example, in U.S. Pat. No. 3,219,623 to Berardinelli.

The crystalline oxymethylene copolymer may also be stabilized by end-capping, again using techniques well known to those skilled in the art. End-capping is preferably accomplished by acetylation with acetic anhydride in the presence of sodium acetate catalyst.

A particularly preferred class of crystalline oxymethylene copolymers is commercially available from Hoechst Celanese Corporation under the designation CELCON acetal copolymer, and especially preferred are copolymers of trioxane with 1.7–2.0 wt. % of ethylene oxide marketed as CELCON M25, M90 and M270 acetal copolymers, which have melt indexes of about 2.5, 9.0 and 27.0 g/10 min. respectively when tested in accordance with ASTM D1238-82.

Crystalline oxymethylene terpolymers having oxymethylene groups, oxy(higher)alkylene groups such as those corresponding to the above-recited general formula:

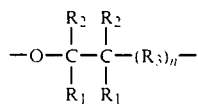

and a different, third group interpolymerizable with oxymethylene and oxy(higher)alkylene groups may be prepared, for example, by reacting trioxane, a cyclic ether or cyclic acetal and, as the third monomer, a bifunctional compound such as diglycide of the formula:

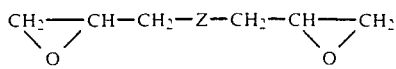

wherein Z represents a carbon-to-carbon bond, an oxygen atom, an oxyalkoxy group of 1 to 8 carbon atoms, inclusive, preferably 2 to 4 carbon atoms, an oxycycloalkoxy group of 4 to 8 carbon atoms, inclusive, or an oxypoly(lower alkoxy)group, preferably one having from 2 to 4 recurring lower alkoxy groups each with 1 or 2 carbon atoms, for example, ethylene diglycide, diglycidyl ether and diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol; 1,4-butanediol; 1,3-butanediol; cyclobutane-1,3-diol; 1,2-propanediol; cyclohexane-1,4-diol and 2,2,4,4-tetramethylcyclobutane-1,3-diol, with butanediol diglycidyl ethers being most preferred.

Generally, when preparing such crystalline terpolymers, ratios of from 99.89 to 89.0 wt. % trioxane, 0.1 to 10 wt. % of the cyclic ether or cyclic acetal and 0.01 to 1 wt. % of the bifunctional compound are preferred, these percentages being based on the total weight of monomers used in forming the terpolymer. Ratios of from 99.85 to 89.5 wt. % of trioxane, 0.1 to 10 wt. % of cyclic ether or cyclic acetal and 0.05 to 0.5 wt. % of diglycidyl ether are particularly preferred, these percentages again being based on the total weight of monomers used in forming the terpolymer.

Terpolymer polymerization in preparing the contemplated crystalline terpolymers may be carried out according to known methods of solid, solution or suspension polymerization. As solvents or suspending agents, one may use inert aliphatic or aromatic hydrocarbons, halogenated hydrocarbons or ethers.

Trioxane-based terpolymer polymerization is advantageously carried out at temperatures at which trioxane does not crystallize out, that is, at temperatures within the range of from about 65° C. to about 100° C.

Cationic polymerization catalysts, such as organic or inorganic acids, acid halides and, preferably, Lewis acids, can be used in preparing the crystalline terpolymers. Of the latter, boron fluoride and its complex compounds, for example, etherates of boron fluoride, are advantageously used. Diazonium fluoroborates are particularly advantageous.

Catalyst concentration may be varied within wide limits, depending on the nature of the catalyst and the intended molecular weight of the crystalline terpolymer. Thus, catalyst concentration may range from about 0.0001 to about 1 wt. %, and preferably will range from about 0.001 to about 0.1 wt. %, based on the total weight of the monomer mixture.

Since catalysts tend to decompose the crystalline terpolymer, the catalyst is advantageously neutralized immediately after polymerization using, for example, ammonia or methanolic or acetonic amine solutions.

Unstable terminal hemiacetal groups may be removed from the crystalline terpolymers in the same manner as they are from other oxymethylene polymers. Advantageously, the terpolymer is suspended in aqueous ammonia at temperatures within the range of from about 100° C. to about 200° C., if desired in the presence of a swelling agent such as methanol or n-propanol. Alternatively, the terpolymer is dissolved in an alkaline medium at temperatures above 100° C. and subsequently reprecipitated. Suitable alkaline media include benzyl alcohol, ethylene glycol monoethyl ether, or a mixture of 60 wt. % methanol and 40 wt. % water containing ammonia or an aliphatic amine.

The crystalline terpolymers may also be thermally stabilized by degrading unstable molecular ends of their chains to a point where a relatively stable carbon-to-carbon linkage exists at each end of each chain. Thermal stabilization will preferably be carried out in the absence of a solvent in the melt, in the presence of a thermal stabilizer.

Alternatively, the crystalline terpolymer can be subjected to heterogeneous hydrolysis wherein water, with or without a catalyst, e.g., an aliphatic or aromatic amine, is added to a melt of the terpolymer in an amount ranging from about 1 to about 50 percent by weight, based on the weight of the terpolymer. The resulting mixture is maintained at a temperature in the range of from about 170° C. to 250° C. for a specified period of time, and then washed with water and dried or centrifuged.

A preferred crystalline oxymethylene terpolymer is commercially available from Hoechst Celanese Corporation under the designation CELCON U10 acetal polymer, and is a butanediol diglycidyl ether/ethylene oxide/trioxane terpolymer containing about 0.05 wt. %, 2.0 wt. %, and 97.95 wt. % of repeating units derived from these termonomers, respectively, based on the total weight of these termonomers.

Additives such as plasticizers, formaldehyde scavengers, mold lubricants, antioxidants, fillers, colorants, reinforcing agents, light stabilizers and other stabilizers, pigments, and the like, can be used with the polymer blends of this invention so long as such additives do not materially affect the desired interaction between the crystalline polymer and the elastomeric copolymer, particularly enhancement of impact strength of blends of the two polymers. Such additives can be admixed with the elastomeric copolymer, the crystalline oxymethylene polymer, or the blend of two using conventional mixing techniques.

Suitable formaldehyde scavengers include cyanoguanidine, melamine and melamine derivatives, such as lower alkyl- and amine-substituted triazines, amidines, polyamides, ureas, metal oxides and hydroxides, such as calcium hydroxide, magnesium hydroxide, and the like, salts of carboxylic acids, and the like. Cyanoguanidine is the preferred formaldehyde scavenger. Suitable mold lubricants include alkylene bisstearamides, long-chain amides, waxes, oils, and polyether glycides. A preferred mold lubricant is commercially available from Glycol Chemical, Inc. under the designation Acrawax C, and is an alkylene bisstearamide. The preferred antioxidants are hindered bisphenols. Especially preferred is 1,6-hexamethylene bis-(3,5-di-t-butyl-hydroxyhydrocinnamate), commercially available from Ciba-Geigy Corp. under the designation Irganox 259.

Suitable compounded crystalline oxymethylene two component copolymers for use in the compositions of this invention are commercially available from Hoechst Celanese Corporation under the designations CELCON M25-04, M90-04 and M270-04 acetal polymers. These are the previously mentioned CELCON M25, M90 and M270 acetal copolymers respectively, each stabilized by 0.5 percent by weight Irganox 259, 0.1 percent by weight cyanoguanidine, and 0.2 percent by weight Acrawax C.

A suitable compounded crystalline oxymethylene terpolymer for use in the compositions of this invention is commercially available from Hoechst Celanese Corporation under the designation CELCON U10-11 acetal polymer. This is the previously mentioned CELCON U-10 acetal terpolymer stabilized by 0.5 percent by weight Irganox 259 and 0.1 percent by weight calcium ricinoleate.

The novel blends of normally non-crystalline elastomeric copolymer and crystalline oxymethylene polymer of this invention may be prepared by any conventional procedure that will result in a substantially uniform blend or admixture of the components. Preferably, dry or melt blending procedures and equipment are used. The elastomeric copolymer, which can range from a dry solid to a slightly tacky material, can be dry mixed with the crystalline oxymethylene polymer (in the form of pellets, chips, flakes, granules or powder), typically at room temperature (about 25° C.), and the resulting mixture melt blended in any conventional type extrusion equipment, which is customarily heated to a temperature of from about 170° C. to about 220° C., and preferably from about 190° C. to about 218° C. The sequence of addition of the components is not critical, and any conventional means may be used to form the substantially uniform admixture.

Preferably, the normally non-crystalline elastomeric copolymer and the oxymethylene polymer are dried (either individually or together) before being subjected to the blending procedure. Drying can be done in desiccated air having a dew point of about −30° C. to −40° C. or lower, at a temperature of from about 70° C. to about 110° C. The drying time will depend primarily on the moisture content, drying temperature and particular equipment employed, but typically will be from about 2 to about 6 hours or more. If drying is conducted for longer periods of time, such as overnight, the drying temperature should preferably be about 70° C. to about 85° C. In general, any conventional drying procedure can be used to reduce the moisture content to below about 0.1 wt. %, based on the total weight of the non-crystalline elastomeric copolymer and the crystalline oxymethylene polymer, preferably below about 0.05 wt. %, and most preferably below about 0.01 wt. %.

If conventional additives such as those previously identified have not previously been added to the normally non-crystalline elastomeric copolymer or the crystalline oxymethylene polymer during the processing of these individual components of the blend, i.e., before they are admixed with each other, they may be added at this time.

The uniform admixture resulting from the blending procedure is then comminuted mechanically, for example by chopping, pelletizing or grinding, into qranules, pellets, chips, flakes or powders, and processed in the thermoplastic state, for example by injection molding or extrusion molding into shaped articles, including bars, rods, plates, sheets, films, ribbons, tubes and the like. Preferably, the comminuted blend is dried again, in the manner discussed above, prior to being molded.

The polymers contained in the compositions of this invention preferably comprise a major amount, i.e., over 50 wt. %, more preferably about 70 to 95 wt. % of the crystalline oxymethylene polymer, and a minor amount, i.e., under 50 wt. %, preferably about 30 to 5 wt. %, of the normally non-crystalline elastomeric copolymer.

The following examples further illustrate the invention.

EXAMPLE 1

In the preparation of an elastomeric copolymer as previously defined, dry, freshly distilled, molten trioxane in an amount of 300 ml was transferred under a nitrogen atmosphere to a half gallon reactor fitted with a magnetic stirrer which was previously purged with nitrogen. There were then added to the reactor under a nitrogen atmosphere 700 ml of dry 1,3-dioxolane and 1 ml of dry 1,4-butanediol diglycidyl ether (BDGE). The mixture was allowed to fall to room temperature (25° C.). The catalyst for the reaction was p-nitrobenzenediazonium tetrafluoroborate (PNDB) which was initially added as 3 ml of a dry solution of 356 mg in 10 ml of nitromethane ($0.45 \times 10^{-3}$ M/l of catalyst). Before reaction started, 1 ml of the reaction mass was tested in a moisture meter and found to contain no water. Subsequently, an additional amount of PNDB as 2 ml of a solution of 1186 mg of the catalyst in 10 ml of nitromethane ($1 \times 10^{-3}$ M/l of catalyst) was added to the reactor.

After about 24 hours of polymerization, the stirrer was stopped and 700 ml of methylene chloride plus enough tributylamine to neutralize the catalyst were added and the reaction shaken for about 24 hours, after which some of the polymer remained undissolved. The solution was then removed from the reactor.

An additional 500 ml of methylene chloride were added to the undissolved polymer and the material shaken for 24 hours, after which some of the polymer still remained undissolved. The solution was removed and added to 1000 ml of cold ethanol and stirred with a mechanical shaft stirrer for 1-2 hours. The resulting two-phase mixture was placed in an ice bath and allowed to stand for two hours after which time solid polymer settled. The ethanol was decanted and the polymer dried in a vacuum oven. The elastomeric copolymer was found by NMR analysis to contain about 32.0 mol % of polymerized trioxane and about 68.0 mol % of polymerized 1,3-dioxolane, and also contained about 0.1 wt. % of BDGE based on the weight of the copolymer. It had an inherent viscosity (IV) of 2.46.

The work-up procedure described in the previous paragraph was repeated with the undissolved polymer remaining in the polymerization reactor. This polymer had an IV of 2.48.

Blends of 70 wt. % of the previously identified normally crystalline CELCON M25 acetal copolymer and 30 wt. % of the foregoing elastomeric copolymer were prepared by loading the two polymers, after drying at 75° C., in a Haake batch mixer equipped with roller blades, at room temperature for under 3 min., and blending the mixture at 195° C. for 14-15 min. after loading.

EXAMPLE 2

The procedure of Example 1 was followed except that previously identified CELCON M90 acetal copolymer was employed as the crystalline acetal polymer.

EXAMPLE 3

The procedure of Example 1 was followed except that previously identified CELCON M270 acetal copolymer was employed as the crystalline acetal polymer.

EXAMPLE 4

The procedure of Example 1 was followed except that the polymers were blended at 216° C. for 10 min. after loading.

EXAMPLE 5

The procedure of Example 2 was followed except that the polymers were blended at 214° C. for 10 min. after loading.

EXAMPLE 6

The procedure of Example 3 was followed except that the polymers were blended at 216° C. for 10 min. after loading.

Polymer blends similar in properties to those of the foregoing examples can be obtained by using an elastomeric copolymer prepared by substituting butadiene diepoxide for the 1,4-butanediol diglycidyl ether in approximately the same amount by weight. Moreover, satisfactory polymer blends under the invention may be made by substituting any of the specific elastomeric copolymers disclosed in previously cited application Ser. No. 243,381 for the elastomeric copolymer utilized in the foregoing examples.

The polymer blends of the foregoing examples may be fabricated into articles similar to those made from previous formulations based on moldable crystalline acetal polymers, but having a higher degree of elasticity and adhesiveness, e.g., to metal.

We claim:

1. A blend of a normally crystalline acetal polymer and a normally non-crystalline elastomeric copolymer of about 15 to 45 mol % of trioxane, about 55 to 85 mol % of 1,3-dioxolane based on the total of trioxane and 1,3-dioxolane, and about 0.005 to 0.15 wt. % of 1,4-butanediol diglycidyl-ether or butadiene diepoxide as a bifunctional monomer, based on the total weight of copolymer.

2. The blend of claim 1 wherein said elastomeric copolymer contains about 25 to 35 mol % of polymerized trioxane and about 65 to 75 mol % of polymerized 1,3-dioxolane based on the total of trioxane and 1,3-dioxolane, and about 0.05 to 0.12 wt. % of polymerized 1,4-butanediol diglycidyl ether or butadiene diepoxide as a bifunctional monomer, based on the total weight of copolymer.

3. The blend of claim 1 wherein said elastomeric copolymer contains polymerized 1,4-butanediol diglycidyl ether as bifunctional monomer.

4. The blend of claim 1 containing polymerized butadiene diepoxide as bifunctional monomer.

5. The blend of claim 1 wherein said elastomeric copolymer has an inherent viscosity of about 0.7 to 2.75 measured at about 25° C. in a 0.2 wt. % solution in hexafluoroisopropanol.

6. The blend of claim 1 wherein said crystalline acetal polymer contains at least 85% of recurring oxymethylene units in the polymer chain.

7. The blend of claim 6 wherein said crystalline acetal polymer is an oxymethylene homopolymer.

8. The blend of claim 6 wherein said crystalline acetal polymer contains 85 to 99.9% of recurring oxymethylene units and 0.1 to 15% of recurring oxy(higher)alkylene units produced by the opening of a ring of a cyclic ether or cyclic formal during copolymerization.

9. The blend of claim 8 wherein said oxymethylene units are produced from trioxane and said oxy(higher)alkylene units are oxyethylene units produced from ethylene oxide during copolymerization.

10. The blend of claim 1 containing a major amount of said crystalline acetal polymer and a minor amount of said elastomeric copolymer.

11. The blend of claim 10 containing about 95 to 70 wt. % of said crystalline polymer and about 5 to 30 wt. % of said elastomeric copolymer.

* * * * *